United States Patent
Northover et al.

(10) Patent No.: US 8,023,771 B2
(45) Date of Patent: Sep. 20, 2011

(54) ADJUSTING LEFT-TO-RIGHT GRAPHICS TO A RIGHT-TO-LEFT ORIENTATION OR VICE VERSA USING TRANSFORMATIONS WITH ADJUSTMENTS FOR LINE WIDTH AND PIXEL ORIENTATION

(75) Inventors: Stephen Northover, Ottawa (CA); Silenio Quarti, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/015,647

(22) Filed: Jan. 17, 2008

(65) Prior Publication Data

US 2009/0187397 A1 Jul. 23, 2009

(51) Int. Cl.
*G06K 9/32* (2006.01)

(52) U.S. Cl. ......... 382/293; 382/282; 382/289; 382/291

(58) Field of Classification Search .................. 382/278, 382/282, 289, 291
See application file for complete search history.

(56) References Cited

U.S. PATENT DOCUMENTS

| 6,212,484 | B1 | 4/2001 | Chen | |
|---|---|---|---|---|
| 7,490,014 | B1* | 2/2009 | Koren et al. | 702/94 |
| 7,512,593 | B2* | 3/2009 | Karklins et al. | 1/1 |
| 7,536,595 | B1* | 5/2009 | Hiltunen et al. | 714/26 |
| 7,564,805 | B1* | 7/2009 | Cortez et al. | 370/255 |
| 7,694,966 | B2* | 4/2010 | Nagasako et al. | 271/303 |
| 2005/0270308 | A1 | 12/2005 | Obinata | |

* cited by examiner

*Primary Examiner* — Yosef Kassa
(74) *Attorney, Agent, or Firm* — Patents on Demand, P.A.; Brian K. Buchheit; Scott M. Garrett

(57) ABSTRACT

The present invention discloses a solution for adjusting a horizontal orientation of a graphic. The solution can include a step of identifying a graphic object having a first horizontal orientation, which is to be changed to an opposite horizontal orientation. A determination as to whether the graphic object has an odd number of pixels along an x-axis can be made. When determination results are positive only, a pixel shift can be applied to the graphic object. A matrix transform can be applied to the software object regardless of the determination results. The software object can be visually presented upon a display after the applying step.

20 Claims, 2 Drawing Sheets

ADJUSTING LEFT-TO-RIGHT GRAPHICS TO A RIGHT-TO-LEFT ORIENTATION OR VICE VERSA USING TRANSFORMATIONS WITH ADJUSTMENTS FOR LINE WIDTH AND PIXEL ORIENTATION

BACKGROUND

1. Field of the Invention

The present invention relates to the field of graphic manipulations and, more particularly, to adjusting left-to-right graphics to a right-to-left orientation using transformations with adjustments for line width and pixel orientation.

2. Description of the Related Art

Modern software programs are often written in an internationalized form to permit a user to choose a language for interactions. Changes to a base language can change a language of menu items, tips, help content, and the like. For example, a user of an internationalized word processing program can often configure the program for English, Spanish, French, German, Hindu, Chinese, Arabic, Hebrew, and other popular languages. Base code of an internationalized program lacks language specific labels. Instead, unique keys are used in the base code, which correspond to a language specific items that are associated with these unique keys. Language specific substitutions can occur at compile time for an internationalized software application or at runtime. Even when software is not internationalized to permit a user to adjust a language, a software development team is often forced to create different variants of a base program adjusted for a national language of a target market. Thus, one variant of a software program is customized for English, another for Spanish, another for Arabic, and so forth.

Changing a language of a software application can involve more than just replacing letters and words from one language to another. Language adjustments can also involve changing an orientation of graphical elements. For example, in a left-to-right language, graphics and text typically start at a top left corner of a window and flow towards the right. For instance, a tree control can expand to the right when a user clicks on an expansion indicator (+/−) and a vertical scroll bar can appear on a right side of a window. In a right-to-left language, however, the same tree control can expand to the left when a user clicks on an expansion indicator and a vertical scroll bar can appear on a left side of a window.

At present, there are two ways to deal with orientation adjustments. A first is to create two versions of all base code, one for a left-to-right orientation and another for a right-to-left orientation. This approach is time consuming, costly, and maintenance intensive. A second approach is to write all base code for a specific orientation and to apply an adjustment algorithm to change an orientation of graphical objects before they are rendered. This second approach is often referred to as mirroring.

Some toolkits exist that provide software tools for mirroring graphics. Unfortunately, pre-existing toolkits produce error prone results. Sometimes mirrored graphics resulting from mirroring tools are properly rendered and other times mirrored graphics appear to be "off by a few pixels." At present, developers have been forced to either use pre-existing toolkits having pixel adjustment issues when mirroring is enabled or to implement orientation adjustments from scratch using application specific code.

SUMMARY OF THE INVENTION

The present invention provides an enhanced mirroring technique for graphics, which yields more accurate results than conventional techniques and which is able to be implemented as a software tool. The enhancement is founded upon a realization that application of a mirroring transformation alone is insufficient to properly adjust a graphic from one horizontal orientation to another. According to the disclosed invention, after a mirroring transform is applied to a graphic, an offset adjustment to the graphic is situationally needed. It is assumed that a-priori knowledge concerning the graphic to be manipulated is unavailable available ahead of time and that a single, general purpose mirroring tool is used that is able to handle all situations without a-priori knowledge.

The disclosed mirroring technique does not rely on pixel by pixel translations. A simple pixel-by-pixel translation can set a right-to-left x value equal to a width of a window minus a left-to-right x value minus the line width. For example, a point at (10,10) in a window that is 100 pixels wide in a left-to-right system would draw at (89, 10) when mirrored. While it is theoretically possible to translate each and every pixel just before it is drawn, this approach is not practical given a construction specifics of modern computer systems. Modern computer systems rely on hardware display drivers to put pixels to the screen. Display drivers often come as part of an operating system. Other than those programmers who implement operating systems, computer games, or the display drivers themselves, access to the low level pixel calculations performed by the driver is generally not available. Further, specifics for interacting with drivers will vary by driver version, video card, and operating system, which makes consistently applying a pixel by pixel translation from a generic tool impractical.

The present invention can be implemented in accordance with numerous aspects consistent with the material presented herein. For example, one aspect of the present invention can include a method for changing a horizontal orientation of a graphic object. The method can include a step of identifying a graphic object having a first horizontal orientation, which is to be changed to an opposite horizontal orientation. A determination as to whether the graphic object has an odd number of pixels along an x-axis can be made. When determination results are positive only, a pixel shift can be applied to the graphic object. A matrix transform can be applied to the software object regardless of the determination results. The software object can be visually presented upon a display after the applying step.

Another aspect of the present invention can include a mirroring tool implemented in software for changing an orientation of a displayable object can include a transform engine and an offset engine. The transform engine can apply a homogeneous matrix transformation to a software object, which is visually displayable. The offset engine can selectively shift a display of the software object after transformations have been applied by the mirroring tool by one pixel along an x-axis. This one pixel shift occurs when the software object has an odd number of pixels along the x-axis. No shifting operations are performed by the offset engine when the software object has an even number of pixels along the x-axis.

Still another aspect of the present invention can include software for mirroring display objects. The software can include a set of programmatic instructions digitally encoded in a machine readable media and executable by at least one computing device. The software can be configured to adjust a horizontal orientation of graphical objects. Horizontal orientation adjustments include an adjustment to change from a left-to-right orientation to a right-to-left orientation or from a right-to-left orientation to a left-to-right orientation. The orientation adjustments can apply a mirroring transformation to graphic objects and can also selectively apply a pixel offset to adjust for line width and/or pixel orientation.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
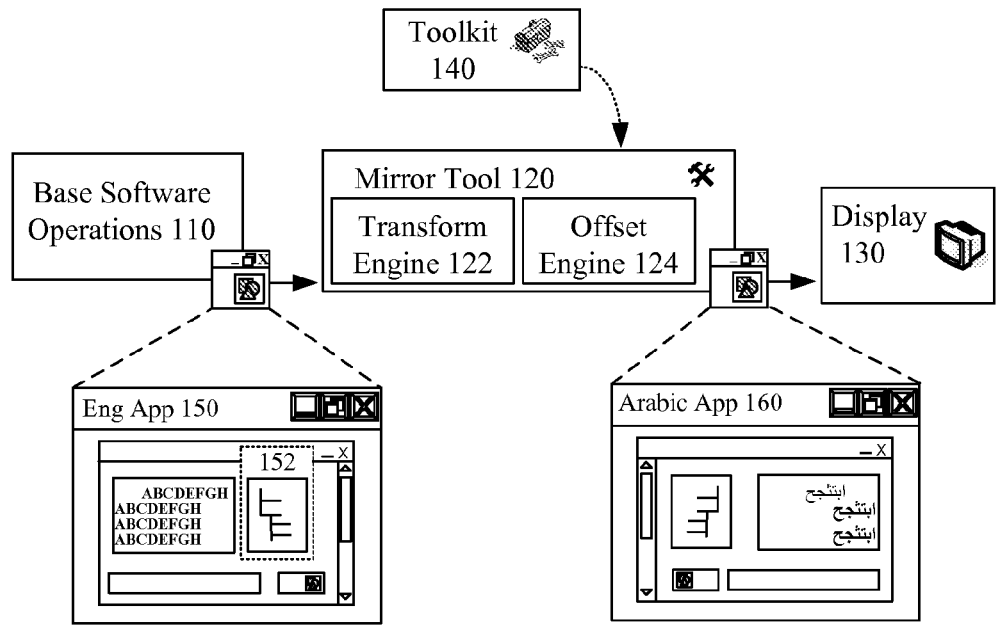
FIG. 1 is a schematic diagram of a system for utilizing a mirror tool implemented in software that is configured to programmatically adjust a horizontal orientation of a graphical object.
Figure 1:
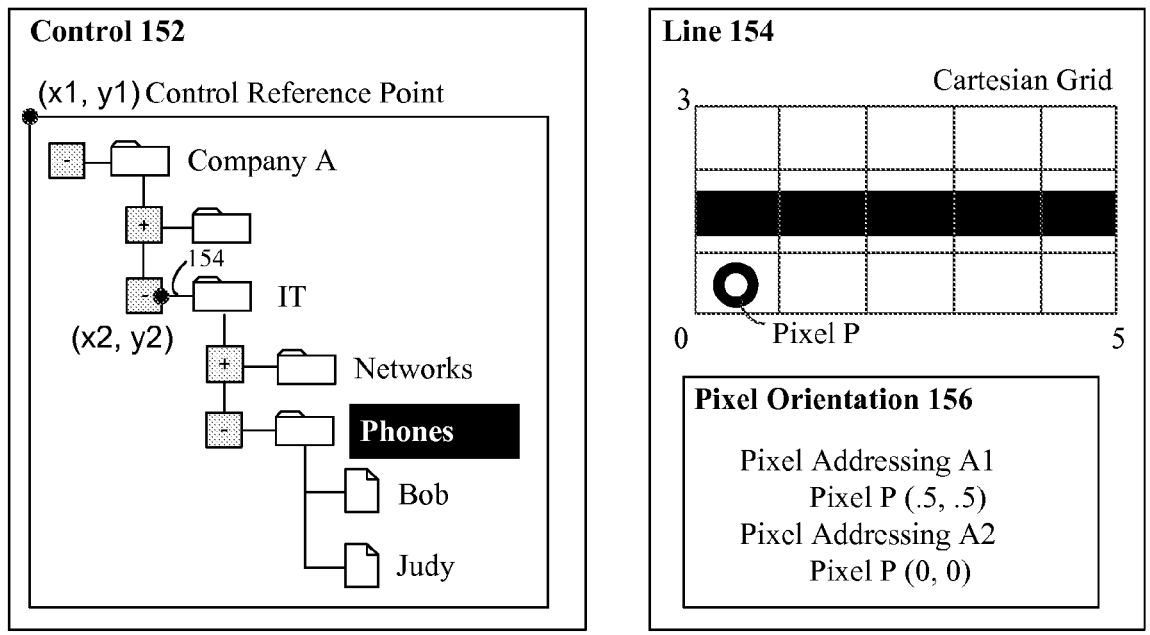

FIG. 1 is a schematic diagram of a system 100 for utilizing a mirror tool 120 implemented in software that is configured to programmatically adjust a horizontal orientation of a graphical object. That is, the mirror tool 120 can consist of a set of digitally encoded programmatic instructions that when executed by a computing device change a graphical object from a left-right orientation to a right-left orientation. This type of orientation change is often performed when adjusting a language used by a text processing/presentation program from a left-to-right oriented language (e.g. English, Spanish, etc.) to a right-to-left oriented language (e.g., Arabic, Hebrew, etc.). For example, an English interface 150 can be processed by the mirror tool 120 to generate an Arabic interface 160. It should be appreciated that the invention is not strictly limited to horizontal orientation changes and the techniques described herein can be used when changing an orientation of a graphical object along any reference plane. When operating along other reference planes, pixel offsets and odd/even value determinations are to be calculated from a direction of the reference plane.

Changing a horizontal orientation when changing from a language implies that controls associated with text can be re-oriented as well. For example, a tree control 152 of an English application 150 (left-to-right oriented) will be modified by mirror tool 120 so that for an Arabic application 160 it is able to expand towards the left instead of expanding towards the right. Similarly, a vertical scroll bar control that is presented on a right side of a window of application 150 can be modified to be presented on a left side of window of application 160.

The mirror tool 120 of system 100 can be a standard software toolkit 140 tool. The software toolkit 140 can be a software library that includes a set of software programs. The tool 120 can be applied to left-to-right oriented graphics generated by base software operations 110. The tool 120 can have no a-priori knowledge of code of the base software and using the mirror tool 120 requires no changes to be made to code performing the base software operations. Thus, the mirror tool 120 can change a horizontal orientation of a graphic object in a manner transparent to the base software. After changes to graphics are made by the mirror tool 120, the modified objects can be rendered upon a display 130 (i.e., sent to a software driver of a video card that renders graphics upon the display 130).

The toolkit 140 can be a user interface toolkit that supports graphics in right-to-left languages. In one embodiment, the mirror tool 120 can be provided for developer use within a software development application, such as an integrated development environment (IDE) application. The mirror tool 120 implemented in system 100 differs from conventional tools by including an offset engine 124 in addition to a transform engine 122.

The transform engine 122 can apply a mirroring matrix to a graphic to horizontally translate the graphic. Using the engine 122 only can result in a pixel shift occasionally occurring when lines are translated. The offset engine 124 can compensate for the pixel shifts.

The mirror tool 120 can operate in a system of relative Cartesian coordinates. For example, a tree control 152 can have a control reference point of (x1, y1), which is a point for the top, left corner of the control 152. A line 154 that is to be modified can have Cartesian coordinates (x2, y2) relative to the point (x1, y1). When the control 152 is modified by the mirroring tool 120 a reference point for the control can be moved to a top right hand corner of the control and a relative beginning position for line 152 can be based upon a position relative to the new reference point.

Appreciably, this relative reference point (x1, y1) can optionally be repositioned relative to a window when a control's horizontal orientation is changed, such as the repositioning of control 152. The control 152 could also retain its relative position in a window of the Arabic application 160 so that a text section is to the left of the tree control, as it is in application 150. Use of a relative coordinates increases the configurability and versatility of the tool 120.

Mirror tool 120 operations can be dependent upon a pixel orientation 156. Pixel orientation 156 of a graphics operation comes into play when an operation uses an even line width. For example, when asked to draw a line that is two pixels wide starting at a point, the pixel at the point is first filled. One more pixel, the one to the left or the right of the point, must then be filled to satisfy the line width. In a left-to-right system, the pixel on the right is filled, because the left-to-right system has a right pixel orientation. As might be expected, a right-to-left system needs a left pixel orientation in order to draw properly.

When implementing a right-to-left system, using the operations of the left-to-right system, a left pixel orientation must be simulated. When the line width is odd, the offset is used to shift points visually to the left. When the line width is even, no offset is necessary. The simulation of opposing pixel orientation for odd widths is performed by the offset engine 124.

Pixel orientation 156 also depends upon which pixel addressing mechanism is used for a graphics system. In some systems, pixels are addressed in a center of a Cartesian coordinate system. For example, Pixel P can be addressed in Addressing A1 as point (0.5, 0.5) of the Cartesian grid. Other systems address pixels starting from the bottom left of the coordinate system. For example, Pixel P can be addressed in Addressing A2 as point (0,0) of the Cartesian grid. For a given graphics system, a pixel addressing scheme is implemented as a constant. The pixel offset applied by offset engine 124 can have a base value of either 0.5 or 1 depending upon a pixel addressing scheme used by the graphics system.

Figure 2:
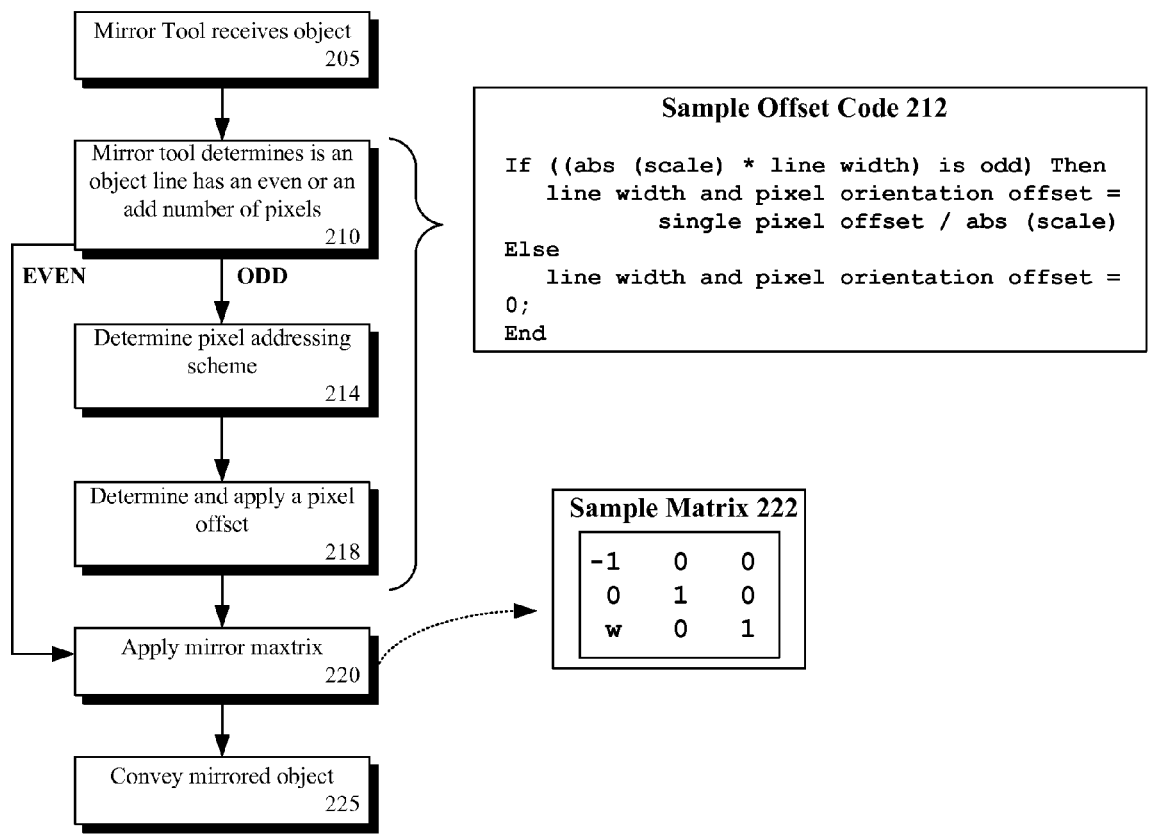
FIG. 2 is a flow chart showing a method for a software based mirroring tool that selectively applies an offset when changing a horizontal orientation of a graphic object.

FIG. 2 is a flow chart showing a method 200 for a software based mirroring tool that selectively applies an offset when changing a horizontal orientation of a graphic object. The method 200 can be performed in a context of system 100.

The method 200 can begin in step 205, when a mirror tool, which can be a software program, can receive an object that is to be mirrored, which occurs before the graphic object is displayed. The mirroring operations performed by the mirror tool can be transparent to base software that generated the object.

The received object can include at least one line, which is to be adjusted by the mirror tool. In step 210, the mirror tool can determine whether the line has an even or an odd number of pixels in horizontal reference plane. If the line has an even number of pixels, steps 214 and 218 can be skipped and the method 200 can proceed directly from step 210 to step 220.

When an odd number of pixels exist for the line along a horizontal reference plane, the method can proceed from step 210 to step 214, where a pixel addressing scheme can be determined. A scale value can be determined based upon this pixel orientation. In step 218, a pixel offset can be computed based upon the addressing scheme and can be applied to the graphic object. The pixel offset is to be applied in a horizontal direction opposite of a current horizontal orientation. So when a current orientation is a right orientation, the pixel adjustment is to be applied to the left.

In step 220, a mirror matrix can be applied to the object, which has possibly had an offset applied in step 218. Once the matrix is applied, the mirror operation is complete, and the mirrored object can be conveyed to an object processing component for display, as shown by step 225.

Sample offset code 212 provides illustrate programmatic logic for determining a pixel orientation offset value. As shown, the code includes a scale value in recognition that the applied offset can be scaled using any additional transformations that might be defined by a programmer in order to determine whether the resulting line width is even or odd. The scale is used to compute the offset that when finally applied, will move the output over by a single pixel, just before it is drawn.

Sample matrix 222 provides sample values for the mirror matrix of step 220. The matrix reflects output in the x-axis and translates it negatively by the width (w) of the window. The matrix 222 is a homogeneous matrix.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for changing a horizontal orientation of a graphic object comprising:
   identifying a graphic object having a first horizontal orientation, which is to be changed to an opposite horizontal orientation;
   determining whether the graphic object has an odd number of pixels along an x-axis;
   only when determination results are positive, applying a pixel shift to the graphic object;
   applying a matrix transform to the software object regardless of the determination results; and
   visually presenting the software object upon a display after the applying step.

2. The method of claim 1, wherein the first horizontal orientation is a left-to-right orientation, and wherein the opposite horizontal orientation is a right-to-left orientation, wherein the pixel shift when applied causes the visually displayed software object to be shifted one pixel to the left.

3. The method of claim 2, wherein said method is executed as part of a language adjustment of an application capable of presenting text in multiple language, wherein the language adjustment is from a left-to-right oriented language to a right-to-left oriented language.

4. The method of claim 3, wherein the steps of identifying, determining, applying a pixel shift, applying a matrix transform are performed by a computing device in accordance with software comprising a set of programmatic instructions digitally encoded within a machine readable medium, wherein said software is a tool of a user interface toolkit.

5. The method of claim 1, wherein the first horizontal orientation is a right-to-left orientation, and wherein the opposite horizontal orientation is a left-to-right orientation, wherein the pixel when applied causes the visually displayed software object to be shifted one pixel to the right.

6. The method of claim 1, wherein the matrix transform is a homogeneous matrix transform, which when applied translates output negatively along a horizontal reference plane by a width of a window within which the software object is to be visually displayed.

7. The method of claim 1, wherein the steps of identifying, determining, applying a pixel shift, applying a matrix transform, and visually presenting are performed by a computing device in accordance with at least one of software and firmware comprising a set of programmatic instructions digitally encoded within a machine readable medium, wherein said software comprises a mirror tool of a user interface toolkit, which directs the computing device to perform the steps of identifying, determining, applying a pixel shift, applying a matrix transform, and wherein said firmware comprises firmware contained in a video card of said computing device, said firmware directing the computing device to perform the visually presenting step.

8. The method of claim 1, further comprising:
   generating the graphic object in accordance with software coded for the first orientation; and
   performing the steps of claim 1, in a manner transparent to the software coded for the first orientation, wherein the visually presenting step results in a presentation of the software object with the opposite horizontal orientation.

9. The method of claim 1, wherein the steps of identifying, determining, applying a pixel shift, applying a matrix transform are performed by a computing device in accordance with mirror tool software comprising a set of programmatic instructions digitally encoded within a machine readable medium, wherein said mirror tool software is a software tool of a user interface toolkit.

10. The method of claim 1, wherein said steps of claim 1 are performed by at least one machine in accordance with at least one computer program stored in a computer readable media, said computer programming having a plurality of code sections that are executable by the at least one machine.

11. A mirroring tool for changing an orientation of a displayable object comprising:
   a transform engine configured to apply a homogeneous matrix transformation to a software object, which is visually displayable; and
   an offset engine configured to shift a display of the software object after transformations have been applied by the mirroring tool by one pixel along an x-axis when the software object has an odd number of pixels along the x-axis and to perform no shifting operations when the software object has an even number of pixels along the x-axis, wherein said transform engine and said offset engine are both implemented within software digitally encoded upon a machine readable medium.

12. The tool of claim 11, wherein when the transform engine applies the homogeneous matrix transformation to the software object, output is translated negatively along a horizontal reference plane by a width of a window within which the software object is to be visually displayed.

13. The tool of claim 11, wherein the mirroring tool is a tool of a user interface toolkit.

14. The tool of claim 11, wherein the software object is a line.

15. The tool of claim 11, wherein the mirroring tool is configured to change a horizontal direction of expansion for a tree control.

16. The tool of claim 11, wherein the mirroring tool is configured to change, which side of a window a vertical scroll control is presented upon.

17. The tool of claim 11, wherein the mirroring tool is a tool used to change graphics of a user interface, when a language change occurs within the user interface from a left-to-right oriented language to a right-to-left oriented language or from a right-to-left oriented language to a left-to-right oriented language.

18. Software for mirroring display objects comprising:
   a set of programmatic instructions digitally encoded in a machine readable media and executable by at least one computing device, wherein said set of programmatic instructions are configured to adjust a horizontal orientation of graphical objects, said horizontal orientation adjustment being an adjustment selected from a set of adjustments consisting of an adjustment from a left-to-right orientation to a right-to-left orientation and an adjustment from a right-to-left orientation to a right-to-left orientation, said set of programmatic instructions applying a mirroring transformation to graphic objects and also selectively applying a pixel offset to adjust for at least one of line width and pixel orientation.

19. The software of claim 18, wherein the set of programmatic instructions are contained in a mirroring tool provided as part of a graphical user interface toolkit, wherein said mirroring tool is able to be added to base software having one horizontal orientation and selectively enabled to change the horizontal orientation without modifying code of the base software.

20. The software of claim 19, wherein the change of orientation is performed dynamically at runtime when the tool is enabled.

* * * * *